United States Patent [19]
Ogino

[11] Patent Number: 5,269,014
[45] Date of Patent: Dec. 7, 1993

[54] AUTOMATIC PROGRAMMING SYSTEM WITH DESIGN REVIEW CAPABILITIES

[75] Inventor: Toru Ogino, Kanagawa, Japan

[73] Assignee: Mitsubishi Denki Kabushiki Kaisha, Tokyo, Japan

[21] Appl. No.: 792,803

[22] Filed: Nov. 15, 1991

Related U.S. Application Data

[63] Continuation of Ser. No. 357,083, May 25, 1989, abandoned.

[30] Foreign Application Priority Data

May 24, 1988 [JP] Japan .................. 63-129501

[51] Int. Cl.5 ............................................. G06F 15/20
[52] U.S. Cl. ................................... 395/500; 364/578;
364/DIG. 1; 364/232.8; 364/275.6
[58] Field of Search ............... 395/500, 700, 140, 12;
364/578, 191, 579

[56] References Cited

U.S. PATENT DOCUMENTS

| | | | |
|---|---|---|---|
| 4,841,479 | 6/1989 | Tsuji et al. | 395/500 |
| 4,845,665 | 7/1989 | Heath et al. | 395/500 |
| 4,860,204 | 8/1989 | Gendron et al. | 395/140 |
| 4,972,334 | 11/1990 | Yamabe et al. | 395/500 |
| 5,101,491 | 3/1992 | Katzeff | 395/500 |
| 5,164,911 | 11/1992 | Juran et al. | 364/578 |
| 5,168,563 | 12/1992 | Shenoy et al. | 395/500 |

Primary Examiner—Kevin A. Kriess
Attorney, Agent, or Firm—Wolf, Greenfield & Sacks

[57] ABSTRACT

An automatic programming system seeks to maximize the automation of software development. This automatic programming system includes a capability to trade-off program structure so as to optimize the structure to fulfill requested software specification requirements. The system also includes an ability to perform failure mode and effect analysis and design review. The design operation and testing operations are directly coupled to each other so that the design data may be utilized effectively during testing.

14 Claims, 6 Drawing Sheets

FIG. 1

| SYMBOL | NAME OF PARTS/ COMPO- NENTS | FUNCTION S/N | FAILURE MODE | CAUSE OF FAILURE MODE | EFFECT OF FAILURE MODE | DEGREE OF EFFECT | DEGREE OF OCCURRENCE | FREQUENCY | RECOMMEN- DATION OF MEASURE |
|---|---|---|---|---|---|---|---|---|---|
| 21 | 22 | 23 | 24 | 25 | 26 | 27 | 28 | 29 | 30 |
|  |  |  |  |  |  |  |  |  |  |

AUTOMATIC PROGRAMMING SYSTEM WITH DESIGN REVIEW CAPABILITIES

This application claims the benefit under 35 U.S.C. §120 of application Ser. No. 07/357,083, filed May 25, 1989, now abandoned.

BACKGROUND OF THE INVENTION

1. Field of the Invention

This invention relates to an automatic programming system for automatically generating software that meet requested specifications.

2. Description of the Prior Art

In one prior art system, program source code is generated from block diagrams from a program analysis diagram (PAD) system. This prior art system is disclosed in more detail in a treatise entitled "Automatic Personal Computer Program Generation Based on PAD Specifications" (Treatise No. 3L-10) in *Transactions II of the 36-th National Lecture Meeting of the Information Processing Society of Japan*. A more general automatic programming system is disclosed in a treatise entitled "—Basic Concept—Consistent Real-Time System Development System" (Treatise No. 5M-10) disclosed in *Transactions II of the 36th-National Lecture Meeting of the Information Processing Society of Japan*. The less general automatic programming system is encompassed with the more general system; thus, the scope of the more general automatic programming system will now be described in more detail.

Figure 6:
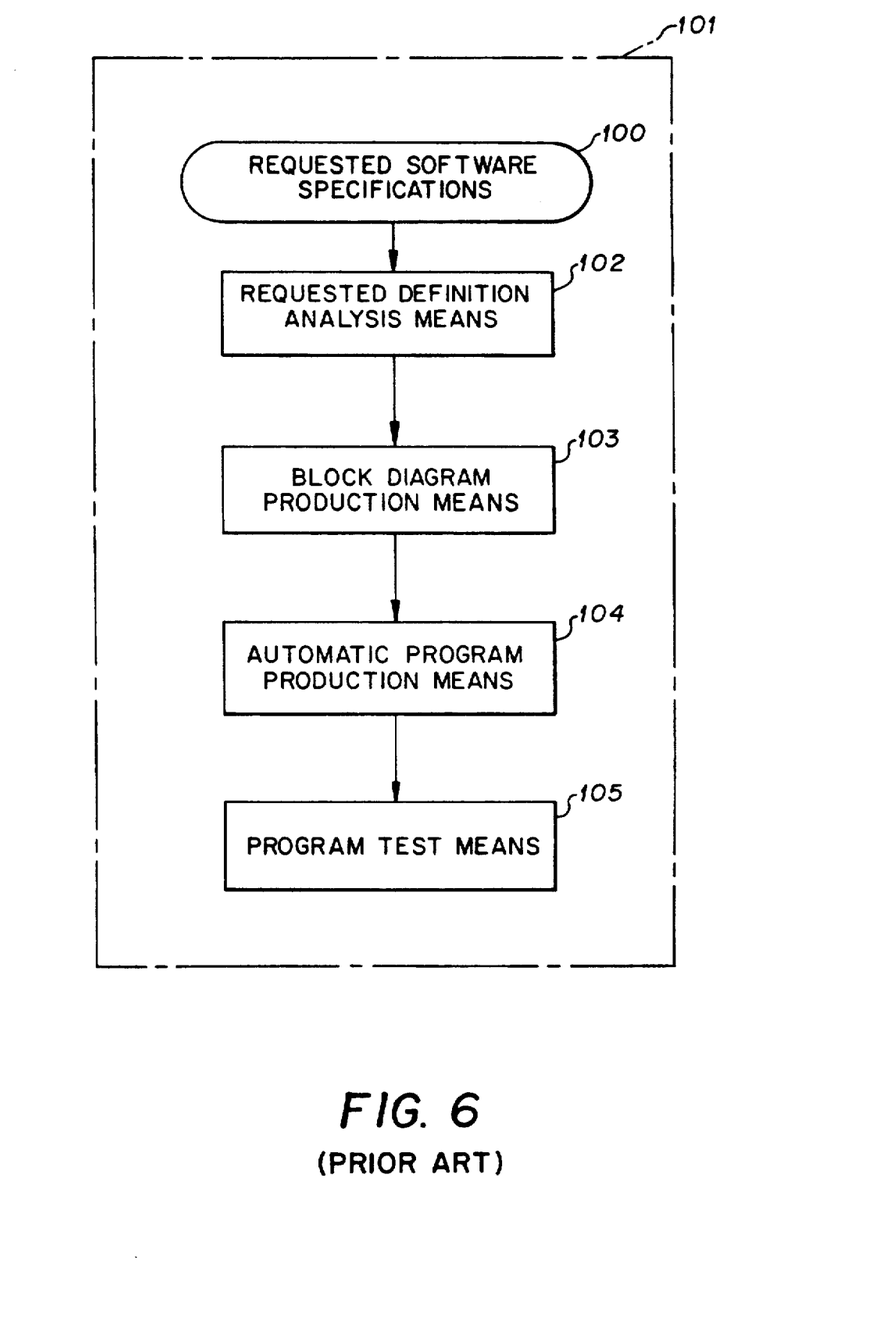
FIG. 6 is a flow chart for explaining a prior art automatic programming system.

The operation of the more general system will now be described with reference to FIG. 6. A user provides a set of requested software specifications 100. These requested specifications set forth the desired functionality of a program that the user wishes to have generated. The specifications from the user are analyzed by a request definition analysis means 102 which processes the specifications to yield information about the functionality and state of the desired code. In the prior art, this means was not implemented as a machine, but rather was performed manually by specialists. This analysis primarily involves devising a program constitution that satisfies the requested specifications. This determination often involves balancing of the program structure to realize an optimum combination of software components.

The results of the definition analysis means 102 are passed to a block diagram production means 103 to produce data flow diagrams, control flow diagrams, module diagrams and PAD diagrams. The production of these diagrams is automated, although not perfectly. The automatic programming production means 104 then uses these diagrams to automatically produce source code (programs) in a machine language that satisfies the requested specifications. Lastly, the program test means 105 performs a program test on the generated code. The program test primarily determines if the specifications are satisfied by the code. It is possible to conduct the program test while simultaneously observing the program execution of the code so as to increase test efficiency. If the program test reveals that the requested specifications are not satisfied, the above described process is repeated.

The design reviewing operation for reviewing the design results to identify and correct deficiencies has all been done manually in the prior art. Hence, no design reviewing software has been assembled in th prior art. Further, no software for performing FMEA (failure mode and effect analysis) has been assembled; rather this analysis has been performed manually.

In the prior art, the program constitution trading-off operation, the failure mode and effect analysis and the design reviewing have been performed manually. As such, the tasks of generating software has been very labor intensive and time consuming. Further, the design stage and test stage are not directly coupled together. Accordingly, the results of design cannot be effectively utilized during testing.

SUMMARY OF THE INVENTION

This invention is intended to solve the above problems, and its object is to provide an automatic programming system, which automates the trading-off operation of producing program structure, failure mode and effect analysis and design reviewing operation at the time of the program design. Thus, this system reduces the time required for each individual operation, and directly couples the design and test function to permit automatic and effective utilization of the design data during testing.

According to the invention, a program constitution trading-off means performs trading-off of the program constitution according to software request specifications to obtain an optimum combination of components constituting the program. A block diagram production means produces block diagrams "m", including signal system diagrams, from the results of the trading-off means 2. A failure mode and effect analysis means performs failure mode and effect analysis on block diagrams "m" to produce an analysis sheet "n". A simulation means performs simulation for confirming the operation of the program constituted by block diagrams "m". A software design reviewing means includes a learning section 6a for acquisition and learning of design knowledge or the like from the process of production of the analysis sheet "n" and the optimum combination of components "l", knowledge base section 6b for storing the acquired design knowledge or the like and inference section 6c for effecting inference by using the acquired design knowledge. An automatic program production means 7 produces program source codes "o" from the block diagrams "m". An automatic program test data production means 8 produces program test rules "p" from the analysis sheet "n", and a program test means 9 performs program tests on program source codes "o" on the basis of the test rules "p".

The above and other objects, features and advantages of the invention will become more apparent from the following description when taken in conjunction with the accompanying drawings.

DETAILED DESCRIPTION OF A PREFERRED EMBODIMENT

Figure 1:
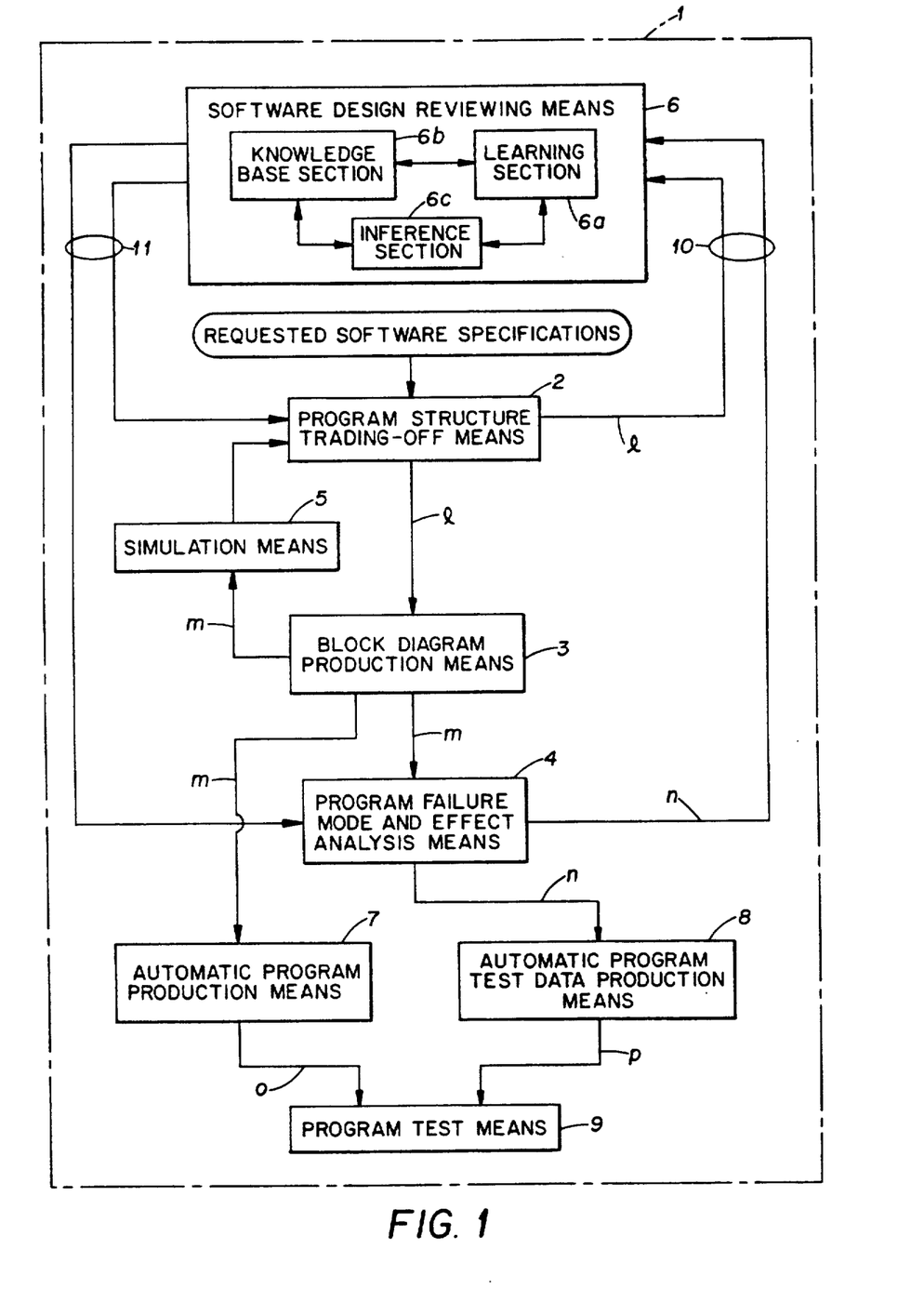
FIG. 1 is a block diagram showing an embodiment of the invention.

FIG. 1 shows a software-implemented automatic programming system 1 of a preferred embodiment of the present invention. The software of the system is run on a processor of a conventional computer.

The automatic programming system 1 includes a program structure trading-off means 2 for creating a program structure and a block diagram production means 3 for producing block diagrams, including signal system diagrams, from the results of the program structure trading-off means 2. The system 1 further includes a failure mode and effect analysis means 4 for performing failure mode and effect analysis using the diagrams produced by the block diagram production means 3 to produce a completed failure mode and effect analysis sheet. A simulation means 5 is provided in the system to perform simulation of the program encoded in the block diagrams to confirm that the generated diagrams meet the requested specifications.

The system additionally includes a software design review means 6 which is made of a learning section 6a, a knowledge base section 6b and a inference section 6c. The learning section 6a learns about software design from the results 10 of the program structure trading-off means 2 and from the results of the failure mode and effect analysis means 4. The knowledge base section 6b stores design knowledge and knowledge gained by the learning section 6a. The inference section 6c performs inferential functions using the knowledge stored in the knowledge base section 6b.

An automatic program production means 7 is included in the system for automatically producing source code from the block diagram of the block diagram production means 3. An automatic program test data production means 8 automatically produces program test data from the results of the failure mode and effect analysis means 4. Lastly, a program test means 9 is used in the system to perform program tests according to the results obtained from the automatic program production means 7 and the automatic program test data production means 8.

Given this construction of the automatic programming system, a program may be automatically generated and tested entirely by software. The user of the system must only provide the requested functional specifications for the program. A more detailed discussion of the system 1 follows.

The structure of the program structure trading-off means 2 is best understood by first examining the typical structure of a program. A program may generally be sub-divided into sub-routines or modules. These units are hereinafter referred to as parts. These parts include objects or classes (as they are known in the field of knowledge engineering). A program unit which is made from a plurality of such parts and which serves a particular function is known as a component. Data concerning these parts and components are preliminarily stored in the knowledge (i.e., data) base section 6b of the software design review means 6.

The program structure trading-off means 2 performs trading-off of a program structure according to the requested software specifications. The requested software specifications prescribe function, performance, scale, etc., for the software that is to be produced by the system 1. Such requested software specifications are employed in the prior art. Trading-off is made between the requested specifications and the realizable program structure to produce a compromise program structure which meets the required specifications as much as possible. The structure is determined in roughly two steps. In the first step, basic structures of program functions which are necessary for realizing rough request functions among the required specifications are determined by trading-off. Then, in the second step, further detailed structures for realizing each individual program function are determined. One suitable method that may be adopted by the software for trading-off the program structure is described in Japanese Laid Open Patent Publication No. 60-120431, entitled "Automatic Programming System".

When determining the basic structure of the program functions and the detailed program structures, the program structure trading-off means 2 is provided with standard evaluation parameters that serve as guides for optimizing the program structure. The standard evaluation parameters include process speed, scale, transplantation property, cost and results of use of program. The process of optimization noted above adopts a process algorithm utilizing a "dynamic planning process" in a mathematical planning method and also uses a "constraint solving theory" (as known in the field of knowledge engineering).

Further, the program structure trading-off means 2 serves the function of interactively performing the program structure trade-off described above with a designer. This function will be described in more detail below.

Where the requested software specification is input by a designer, component data meeting the requested specifications or equivalent data is selected from among component data bases in the knowledge base section 6b of the software design review means 6. This component data is displayed as combination data on a graphic display screen. The component data bases hold values for standard evaluation parameters such as process speeds, scales, transplantations properties, costs, input/output conditions, and results of use. The designer can determine an optimum component combination "l" of the basic constitution by performing an optimization process using the requested software specifications and these evaluation parameters. If necessary, the designer may alter the component combination. In addition, a combination of parts is determined with respect to a detailed program structure consisting of parts.

The block diagram producing means 3 produces program block diagrams "m" based on the structures chosen for program by the program structure trading-off means 2. The block diagrams "m" may be viewed in aggregate as a program for performing the same processes as are specified in the code. A suitable method for producing these block diagrams "m" is described Japanese Laid open Patent Publication No. 60-159939, entitled "Automatic Diagram and Source Program Generation System".

The failure mode and effect analysis means 4 performs failure mode and effect analysis (abbreviated FMEA) on the basis of the program block diagrams m to produce an FMEA sheet "n".

The FMEA process is an analysis process used in system engineering analysis at the time of the design. According to the invention, this FMEA process is applied to the failure mode and effect analysis of the program. In case of the software (program), the concept of the above parts and components is introduced, and the operation of this FMEA process is introduced into the failure mode and effect mode analysis of the program.

The program designer executes the FMEA process interactively with the system 1. Specifically, the process is performed interactively by a specialist designer by responding to queries on a graphical display.

The failure mode and effect analysis means 4 comprises an FMEA format production program and a question generation process program. Such a means 4 is not known in the prior art. The operations of these two programs will now be described in greater detail.

(a) FMEA Format Production Program

Figure 2:
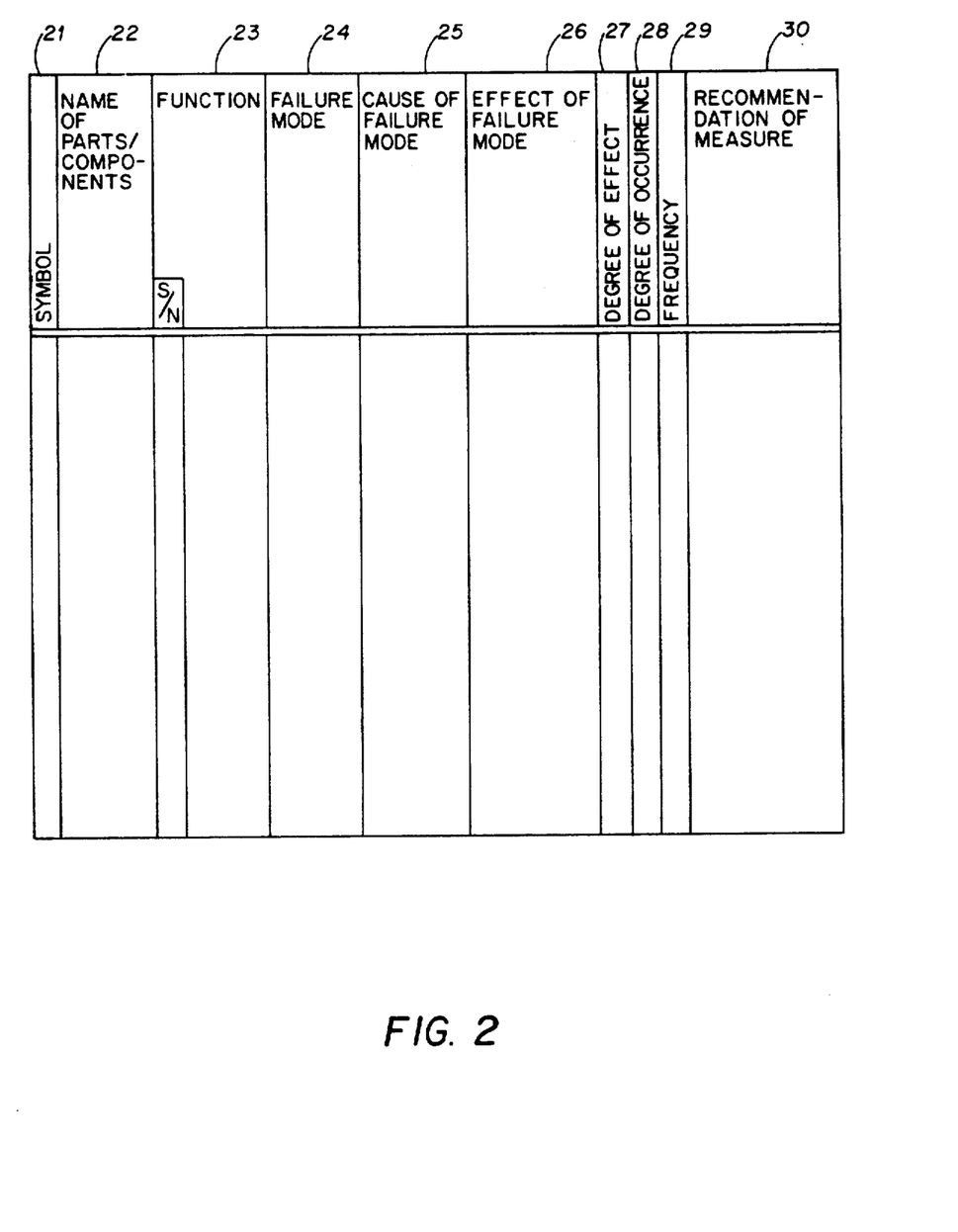
FIG. 2 is a view showing a format of an FMEA sheet (analysis sheet) produced by a failure mode and effect analysis means shown in FIG. 1.

This program produces a format of the FMEA sheet on the basis of the FMEA process. It serves to produce a suitable format for the FMEA sheet, and it is produced automatically. FIG. 2 shows an example of an illustrative format for a FMEA sheet. Column 21 is for holding symbols. The name of parts and components associated with the symbol are held in column 22. Furthermore, the function of the parts and components associated with the symbol are held in column 23.

Columns 24, 25 and 26 all concern failure modes. In particular, column 24 is used to store failure mode information, and column 25 is used to store causes for the failure mode. Lastly, column 26 stores the effect of failure mode.

Columns 27, 28 and 29 are used to hold status information. In particular, column 27 holds information concerning the degree of effect of failure mode, whereas column 28 holds information concerning the degree of occurrence of failure mode. Column 29 holds information concerning the frequency of failure mode. Lastly, column 30 holds a recommendation of measure.

(b) Question Generation Process Program

This program generates questions to prompt information from the designer for filling in the contents of each vacant column of the FMEA sheet produced by the above FMEA format production program. It displays these prompting questions on the graphical display screen. The designer responds to these questions, and the responses are used to fill in corresponding FMEA sheet columns.

Figure 3:
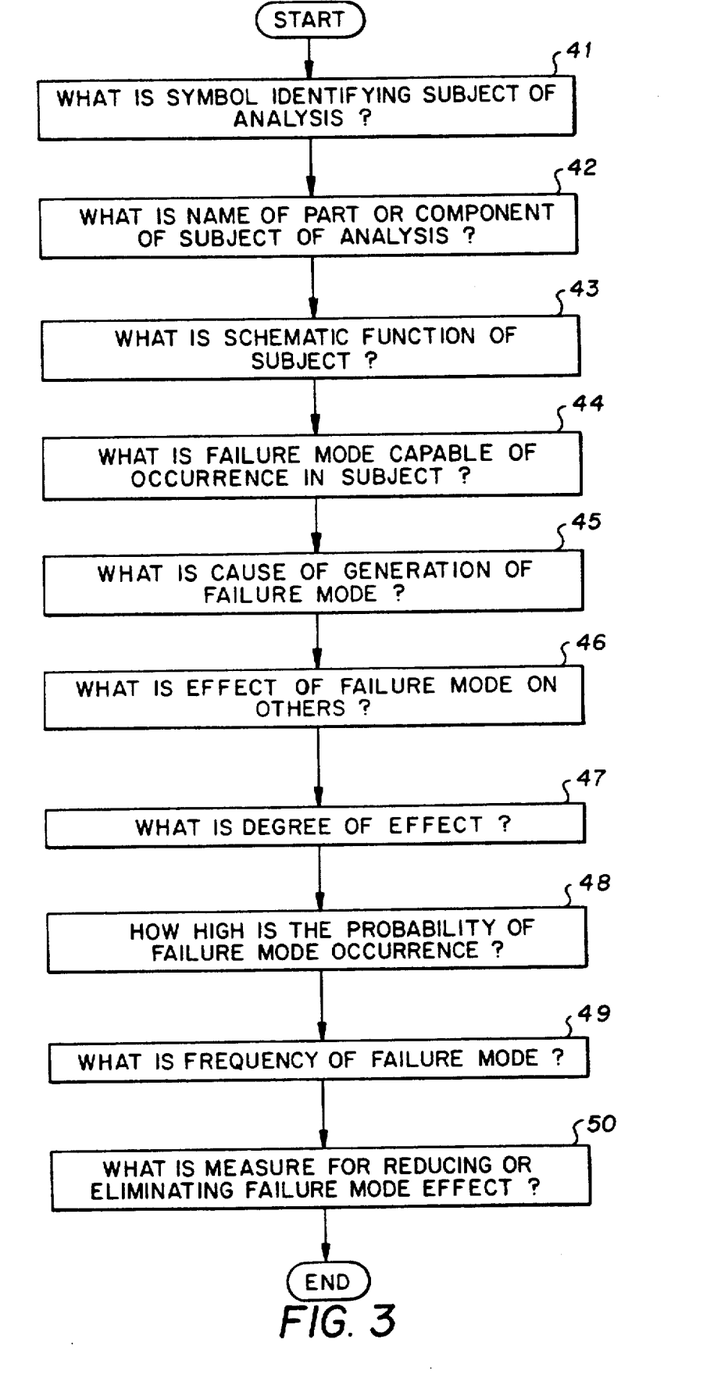
FIG. 3 is a flow chart for explaining the operation of the failure mode and effect analysis means.

FIG. 3 shows a flow chart of an example of a sequence of questions generated by a program to fill in the FMEA sheet of FIG. 2. A particular question is asked for information to complete each column of the FMEA sheet of FIG. 2. For instance, in order to fill in column 21, the designer is asked what is the symbol that identifies the subject matter of the analysis (see question 41 in FIG. 3). Likewise, in order to complete column 22 in FIG. 2, the designer is asked what is the name of the part or component that is subject to analysis (see step 42 in FIG. 3). Analogously respective questions 43 to 50, shown in FIG. 3, are asked to fill in the respective columns 23 and 30 of FIG. 2. As the specialist inputs sequential answers to questions 41 to 50 from a keyboard or other suitable input device of the automatic programming system 1, the program functions to fill the input answers into each column of the FMEA sheet to complete the FMEA sheet (analysis sheet) "n".

Further, each of the values contained in the knowledge base section 6b of the software design review means 6 are quoted at the time of producing the FMEA sheet (analysis sheet) "n".

The simulation means 5 is a program for simulating operation of the program, including confirmation of whether it is possible to attain a program function that satisfies the specifications (hereinafter referred to as design specifications). This simulation program is similar to a general simulation program. It may be implemented like the simulation program described in T. Ogino et al, "An Intelligent CAD/CAT System for Design and Testing", *J. Artificial Intelligence Society*, vol. 5, No. 4, July 1990. If the simulation reveals that no function satisfies the design specification, the system returns to the program constitution trading-off means 2 to review the program constitution and performs program constitution trading-off again. These operations are done repeatedly until a function satisfying the design specification is obtained.

The software design review means 6 includes the learning section 6a, the knowledge base section 6b and the inference section 6c as shown in FIG. 2. In the knowledge base section 6b, previously designed parts are stored along with parts (i.e. sub-routines and modules) produced by the trading-off means 2. The software design review means 6 has the following three different functions, which will now be described in more detail.

(1) The Design Knowledge Acquisition and Learning Function

As shown above in FIG. 1, design knowledge (i.e., data) and rules are extracted from the results of the program constitution trading-off means 2 and from the results of the failure mode and effect analysis means 4. These results are designated by reference numeral 10 in FIG. 1. The two types of knowledge and the extracted rules are arranged to produce knowledge for design reviewing software. This knowledge is stored as a knowledge base in the knowledge base section 6b.

(2) The Design Evaluation Function

The design is reviewed using the knowledge for design reviewing stored in the knowledge base section 6b. Deficiencies in the design revealed by the review are identified to provide data 11 to the program constitution trading-off means 2 and the failure mode and effect analysis means 4 for effecting evaluation, improvement and confirmation of the program design.

(3) The Design Consultation Function

Entries in the knowledge base is retrieved in response to an inquiry from a designer to provide various information necessary to the design.

The above three functions (1) to (3) can be implemented through interlocked operation of the learning section 6a, the knowledge base section 6b and the inference section 6c. These sections will now be described in more detail.

(A) Learning Section 6a

The learning section 6a has the primary role of

The learning and studying design knowledge and performing intelligent processes using the knowledge base section 6b and inference section 6c.

By the term "intelligent" implies that there is some capacity for effecting "some inference" on the basis of the knowledge base and the inference function. "Some inference" refers to what is generally defined in the field of the knowledge engineering as "inference" such as deductive inference, inductive inference or analogical inference.

The learning section 6a may automatically produce knowledge about a program for use in design reviewing by heuristic or experimental learning of design knowledge acquired by using the above described inference functions and knowledge base.

The term "heuristic learning" refers to learning like the above described inductive inference or the like. Fragments of acquired knowledge are classified and arranged in a systematic structure which is stored in the knowledge base.

(B) Knowledge Base Section 6b

The knowledge base section 6b stores edited and arranged pieces of knowledge, components, and parts for programs.

There are four kinds of knowledge (i.e., data):

(i) Past Design Data

Design data expressed by characters, numerals, drawings and other images, malfunction data, check lists, etc., concerning past examples of program design (including parts and components);

(ii) Design Data Acquired During the Current Pass of the System

Design data acquired from the results of processes of the program constitution trading-off means 2 and the failure mode effect analysis means 4;

(iii) Learning Result Data

Design and design review knowledge obtained from design data secured in (i) and (ii) as a result of learning using the inference function; and

(iv) Design Model Data

These types of data are also known as "object models" in the field of knowledge engineering. This data expresses design objects. The four different kinds of data, described above, are stored in various forms in the knowledge base section 6b. In the knowledge nomenclature of the field of knowledge engineering, these forms include, "production system", "frame", "blackboard model", "meaning network", "predicative theory" and "object".

(C) Inference Section 6c

The inference section 6c is a mechanism independent of the learning section 6a and knowledge base section 6b. It performs inference using the knowledge stored in the knowledge base section 6b.

"Inference" refers to a function of deriving a piece of data from known data which has a same meaning, or deriving a piece of data, which is included in that data but is in a different expression at least in an elucidative form. A syllogism is an inference.

The inference section 6c, however, is provided not only with a syllogism but also with various other inference functions generally defined in the field of the knowledge engineering such as inductive inference, analogical inference and default inference.

As is obvious from the above, the software design review means 6 is provided with a design knowledge acquisition and learning section, a design evaluation function, a consultation function. The three sections of the software design review means may be implemented using knowledge engineering technology as described in P. Cohen et al, *Handbook of Artificial Intelligence*, 1982, Chapter 14.

The automatic program production means 7 produces source code "o" from the block diagrams "m" produced by the block diagram production means 3. The block diagrams "m" are broken into identifiable sub-routines and modules, and they can be automatically produced from the previously-described part data (knowledge) bases.

The automatic program test data production means 8 automatically produces program test data from the results of analysis of each failure mode executed by the failure mode and effect analysis means 4 and from the resultant effect. Here, the program test data is referred as test (diagnosis) rules "p". Various deficiency cases are examined, and corresponding failures are distributed in advance. These rules are supplied to the knowledge data base section of the program test means 9 and serve as test rules "p" which correspond to diagnostic decision standards for program test.

Figure 4:
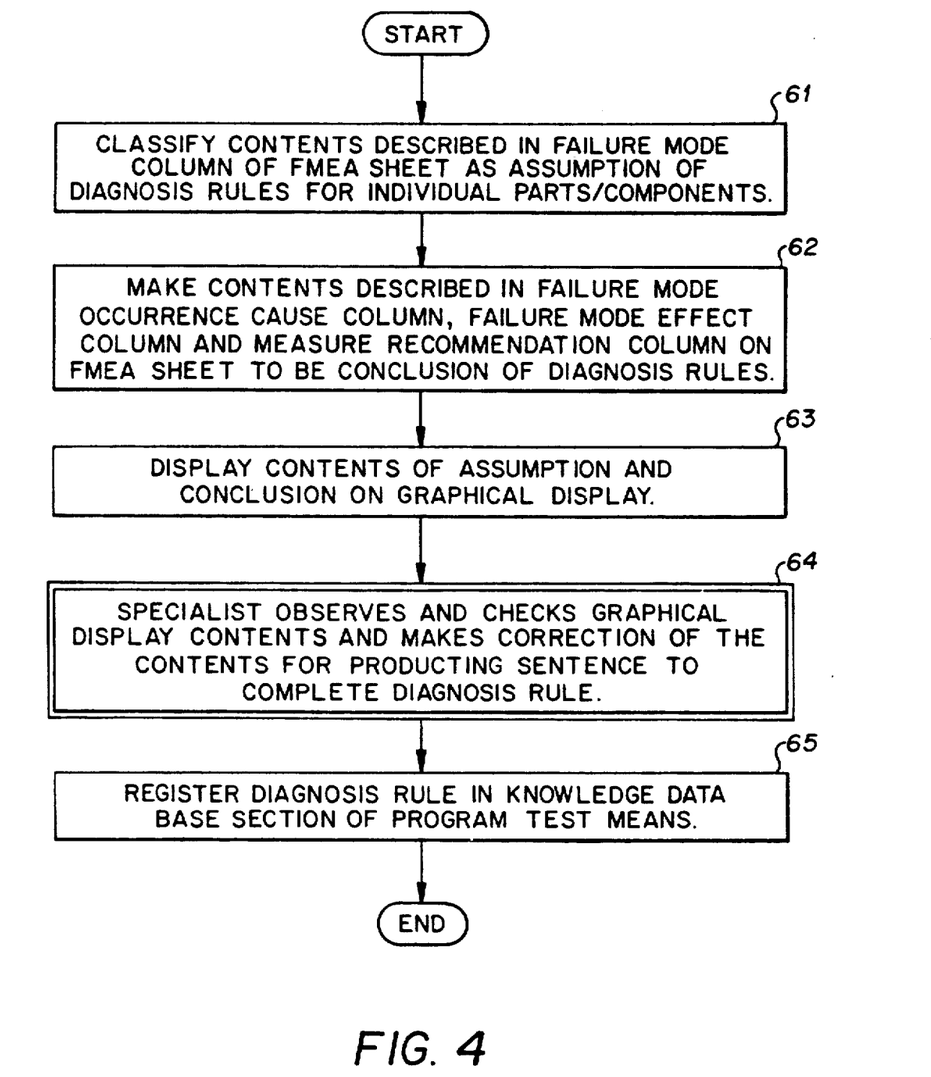
FIG. 4 is a flow chart for explaining the operation of the automatic program test data production means shown in FIG. 1.

FIG. 4 is a flow chart for explaining the operation of the automatic program test data production means 8. In step 61, the contents described in the failure mode column of the FMEA sheet are classified as the assumption of diagnosis rules for individual part/components. In step 62, the contents of the failure mode occurrence cause column, the failure mode effect column, and the measure recommendation column on the FMEA sheet are made to be the conclusion of diagnosis rules. Once the steps 61 and 62 have been completed, the contents of the assumption and conclusion are displayed on the graphical display in step 63. The designer then observes and checks the graphical display content. The designer makes correction of the contents to produce a complete diagnosis rule (step 64). Lastly, in step 65, the diagnosis rule is registered in the knowledge database section of the program testing means. Steps 61, 62, 63 and 65 are executed automatically, In step 64, the contents of a program diagnosis rule produced in steps 61 to 63 is checked. If necessary, the specialist may correct the rule. The corrected program diagnosis rule (or test rule) "p" thus obtained is stored in the knowledge data base section of the program test means 9 to be utilized in the program test.

The program test 9 means performs a test on a program source code obtained from the automatic program production means 7 according to the program diagnosis rules (test rules) "p" produced from the automatic program test data production means 8. The program test means 9 performs an operation similar to a "diagnostic expert system" as shown in the field of the knowledge engineering and artificial intelligence. It includes a knowledge data base section and an inference function section (not shown).

Program diagnosis rules (test rules) "p" for program test are stored in the knowledge data base section. The inference function section is formed from an "inference engine" as shown in the field of the knowledge engineering and artificial intelligence. This software provides an algorithm for inferring a result by a syllogism or like process. The diagnosis rules "p" are used in inferring a diagnosis result. The program test means may be implemented in a manner analogous to that described in T. Ogino et al, "A Feasibility Study of an Expert System for a Space Station and Experiments in Space", *Space Tech.*, Vol. 7, No. 4, pp. 273-279 (1987).

Figure 5:
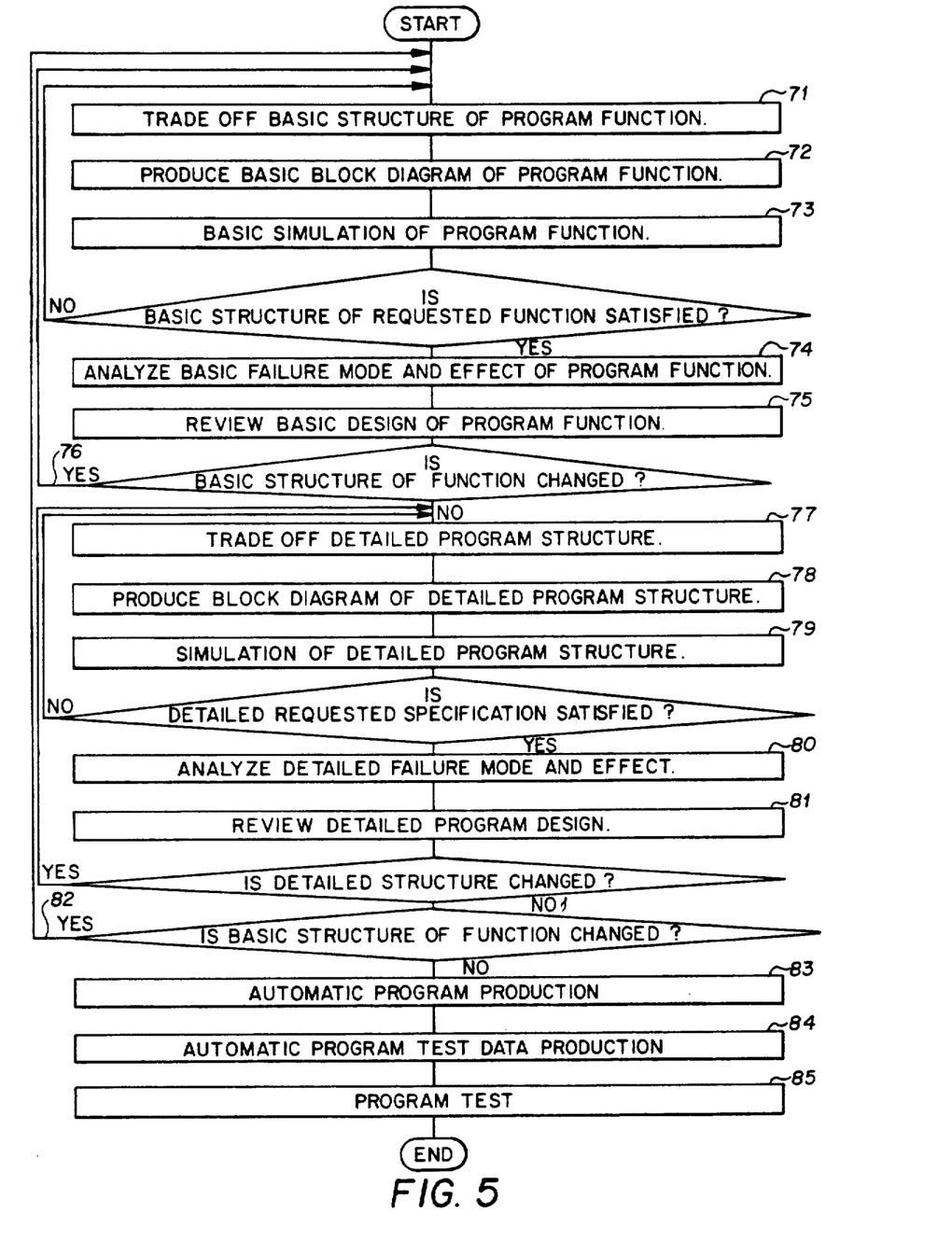
FIG. 5 is a flow chart for explaining a series of operations of all the means assembled in the automatic programming means.

While the construction, operation and effect of the individual means assembled as software in the automatic programming system 1 have been described, the relation among the individual means and overall operation and effect of these means are shown in the form of flow chart in FIG. 5.

As shown in FIG. 5, the program structure trading-off means 2 first performs trading-off of the basic structure of program function according to ideal requested specifications of software design (step 71). From the result of trading-off, the block diagram production means 3 produces a basic block diagram of program function (step 72). Using this basic block diagram, the simulation means 5 performs basic simulation of program function for confirming basic operation of program function (step 73). If the requested specifications are satisfied, the system performs step 74. Otherwise, the routine goes back to step 71. In step 74, the program failure mode and effect analysis means 4 performs basic failure mode and effect analysis of program function according to the basic block diagram thereof. As a result, an FMEA sheet is produced.

Then, the software design review means 6 performs basic design review of the program function for reviewing the design operations (step 75). In the next step 76, a check is done on the result of the design review to determine whether it is necessary to change the basic structure of program function. If the check indicates that a change is necessary, the routine goes back to the step 71 of trading-off the basic structure of program function to perform the process as described above. In step 75, the program function design review may, if necessary, be executed after each of the steps described above.

When no change of the basic structure of program function is necessary, the routine goes to step 77, which involves trading-off detailed program structures. Like step 71, which is concerned with trading-off the basic structure of program function, a detailed structure block diagram is produced after step 77 (step 78). Then, a simulation step 79 is performed. Subsequently, step 80 is performed. In particular, failure mode and effect analysis on the program are performed to produce the FMEA sheet. Subsequently, design review is performed with respect to the detailed program structure (step 81). This step 81 of design review may, if necessary, be executed after the step 77 of trading-off the detailed program structure. If it is found that it is necessary to change the basic structure of the program function, the step 71 of trading-off the basic structure of program function is executed again. In this case, the routine goes back to the first step 71.

When the FMEA sheet production is completed with completion of the steps concerning the basic structure of the program function and the detailed program structure, an automatic program production step 83 is executed to produce program source codes. Then, the automatic program test data production means 8 executes an automatic program test data production step 84 according to the FMEA sheet produced to produce program diagnosis rules, which are stored in the knowledge data base section of the program test means 9. Finally, the program test means 9 performs a program test step 85.

In the above embodiment, the diagnosis rules stored in the knowledge data base section of the program test means 9 are in the form that "if it is B, it is A". However, this form of diagnosis rule is by no means limitative, and it is possible to adopt any other diagnosis rule forms such as a "frame", a "blackboard model", a "meaning network", "predicative logic" and a "object", or a plurality of these forms may be adopted in combination. Also, the program test means 9 may adopt other inference functions than the syllogism, for instance, it may adopt inductive inference, analogical inference and default inference.

Further, the result of the program test means 9, like the results 10 obtained form the program structure trading-off means 2 and program failure mode and effect analysis means 4, may be supplied to the software design review means 6 so that the result of the program test may be utilized for the production of data useful in software design reviewing.

Further, while in the above embodiment, the means 2 to 9 are all constituted by software, it is also possible to adopt hardware or firmware or combination thereof, so long as similar functions and performance can be obtained. As examples of such hardware and firmware, a neurochip may be used, or alternatively, a fuzzy chip may be used to perform some of the above-described operations.

Further, while a conventional single processor computer is used for each of the means 2 to 9, there is no limitation on the kind of computer that may be used so long as the computer may practice the invention. Further, not only a single processor system, but also a multiple processor data processing system may be employed.

Further, while the data of parts and components used in the program structure trading-off means 2 are contained in the knowledge base section 6b, this data may as well be stored in distributed fashion in separate data bases other than the knowledge base section 6b.

As has been described in the foregoing, according to the invention different mans for automating the operations of software design, production and test are assembled as software in a computer such that the individual means are operable in an interlocked relation to one another. This system increases the speed of software design, design review and program production.

While the present invention has been shown with respect to preferred embodiments thereof, those skilled in the art will know of other alternative embodiments which do not depart from the spirit and scope of the invention as defined in the appended claims.

What is claimed is:

1. An automatic programming system comprising:
   (a) a program constitution trading-off means for determining an optimum combination of components for a piece of software corresponding to a given software specification, which identifies functions, performance and scale of the piece of software, by analyzing possible combinations of components in view of operation parameters, wherein said components include sub-routines and/or modules;
   (b) block diagram production means for producing block diagrams such as sub-routine, module and signal system diagrams from a result of the optimum combination of components;
   (c) program failure mode and effect analysis means for performing failure mode and effect analysis of the program from the block diagrams to produce an analysis sheet;
   (d) simulation means for performing simulation for confirming the operation of the program constituted by the block diagrams to ensure that it satisfies the software specification;
   (e) software design reviewing means including:

(i) a learning section for learning of design knowledge about the piece of software from the analysis sheet;

(ii) a knowledge base section for storing the learned design knowledge; and (iii) an inference section for effecting inference by using the acquired design knowledge;

(f) automatic program production means for producing program source codes from block diagrams wherein said codes are produced by relating portions of the block diagrams to source codes based on a member data base;

(q) automatic program test data production means for producing program test rules from the analysis sheet; and (h) program test means for performing program tests on the program source codes on the basis of the test rules.

2. An automatic programming system according to claim 1, wherein said program constitution trading off means has;

(a) evaluation reference parameters for optimizing trading-off; and (b) is provided with a function of effecting an optimization process and also effecting trading-off in colloquy with a designer to determine a basic structure of program functions necessary for realizing rough requested functions in the specification for the piece of software and then determine detailed structures for realizing each such requested function.

3. An automatic programming system according to claim 1, wherein said learning section includes design knowledge acquisition and learning means for (i) accepting result data, said result data including data from said program constitution trading-off means defining a combination of components, and analysis data from said program failure mode and effect analysis means, (ii) extracting design knowledge and rules from the result data, (iii) transforming the design knowledge and rules into knowledge for design reviewing, and (iv) storing the knowledge for design reviewing.

4. An automatic programming system for developing a computer program, comprising:

(a) program constitution trading-off means for (i) allocating requirements for functions and scale to basic components of said program, said basic components including sub-routines and modules, (ii) encoding such requirements, (iii) storing such requirements in a member database, and (iv) obtaining an optimum combination of said basic components according to parameters including processing speed, scale, portability, cost and use records of each of said basic components;

(b) block diagram production means for producing a block diagram including a sub-routine diagram, a module diagram and a signal system diagram corresponding to the optimum combination of said basic components;

(c) program failure mode and effect analysis means for producing an analysis sheet using an analysis of failure mode and effects of said program based on said block diagram;

(d) simulation means for performing simulation and checking whether the program defined by said block diagram satisfies said requirements;

(e) software design reviewing means including (1) a learning section for extracting rules from the optimum combination of said basic components and said analysis sheet, and for accepting and learning design knowledge for the production of programs, (2) a knowledge base section for storing the acquired design knowledge, and (3) an inference section for effecting inference by classifying and systematizing the acquired design knowledge;

(f) automatic program production means for producing program source code by using source code fragments stored in a member database to implement said basic components;

(g) automatic program test data production means for producing program test rules to which corresponding possible failures may be allocated so as to permit checking of failures in each of said basic components using said analysis sheet; and (h) program test means for performing program test on said program source codes according to said test rules;

wherein said program failure mode and effect analysis means includes:

(1) formatting means for creating a format including items for (i) names of said basic components, (ii) functions of said basic components, (iii) possible failures of said basic components, (iv) causes of said failures, and (v) effects of said failures, and (2) question production processing means for producing and displaying questions for each item of said format so as to allow a designer to enter answers including the names, functions and possible failures of basic components in question, and causes and effects of said failures based on technical knowledge of the designer, for inputting these answers into the respective item, for classifying said possible failures by each of said basic components, for inputting names, functions and possible failures of basic components into an assumption section of diagnosis rules, and for inputting causes and effects of said failures into a conclusion section of diagnosis rules.

5. An automatic programming system according to claim 3, wherein said inference section includes design evaluation means for reviewing a design of the piece of software including (i) means for using said knowledge for design reviewing to identify deficiencies in the design, and (ii) means for passing evaluation data to said program constitution trading-off means and to said program failure mode and effect analysis means.

6. An automatic programming system according to claim 5, wherein said program constitution trading-off means includes design consultation means for accepting any inquiry including system specifications and retrieving data from the knowledge base section in accordance with the inquiry.

7. An automatic programming system according to claim 1, wherein said program failure mode and effect analysis means includes:

(1) formatting means for creating a format including items for (i) names of said basis components, (ii) functions of said basic components, (iii) possible failures of said basic components, (iv) causes of said failures, and (v) effects of said failures, and (2) question production processing means for producing and displaying questions for each item of said format so as to allow a designer to enter answers including the names, functions and possible failures of basic components in question, and causes and effects of said failures based on technical knowledge of the designer, for inputting these answers into the respective item, for classifying said possible failures by each of said basic components, for inputting names, functions and possible failures of basic components into an assumption section of diagnosis rules, and for inputting causes and effects of said failures into a conclusion section of diagnosis rules.

8. An automatic programing system according to claim 1, wherein said inference section includes design evaluation means for reviewing a design of the piece of software including (i) means for using said knowledge for design reviewing to identify deficiencies in the design, and (ii) means for passing evaluation data to said program constitution trading-off means and to said program failure mode and effect analysis means.

9. An automatic programming system according to claim 1, wherein said program constitution trading-off means includes design consultation means for accepting an inquiry including system specifications and retrieving data from the knowledge base section in accordance with the inquiry.

10. An automatic programming system for developing a computer program, comprising:
   (a) program constitution trading-off means for (i) allocating requirements for functions and scale to basic components of said program, said basic components including sub-routines and modules, (ii) encoding such requirements (iii) storing such requirements in a member database, and (iv) obtaining an optimum combination of said basic components according to parameters including processing speed, scale, portability, cost and use records of each of said basic components:
   (b) block diagram production means for producing a block diagram including a sub-routine diagram, a module diagram and a signal system diagram corresponding to the optimum combination of said basic components;
   (c) program failure mode and effect analysis means for producing an analysis sheet using an analysis of failure mode and effects of said program based on said block diagram;
   (d) simulation means for performing simulation and for checking whether the program defined by said block diagram satisfies said requirements;
   (e) software design reviewing means including a learning section, wherein said learning section includes design knowledge acquisition and learning means for (i) accepting result data, said result data including data defining a combination of basic components from said program constitution trading-off means, and analysis data from said program failure mode and effect analysis means, (iii) extracting design knowledge and rules from the result data, (iv) transforming the design knowledge and rules into knowledge for design reviewing, and (v) storing the knowledge for design reviewing in said knowledge base section;
   (f) automatic program production means for producing program source code by using source code fragments stored in a member database to implement said basic components;
   (g) automatic program test data production means for producing program test rules to which corresponding possible failures may be allocated so as to permit checking of failures in each of said basic components using said analysis sheet; and
   (h) program test means for performing program tests on said program source codes according to said test rules.

11. An automatic programming system according to claim 10, wherein said inference section includes design evaluation means for reviewing a design of the piece of software including (i) means for using said knowledge for design reviewing to identify deficiencies in the design, and (ii) means for passing evaluation data to said program constitution trading-off means and to said program failure mode and effect analysis means.

12. An automatic programming system according to claim 10, wherein said program constitution trading-off means includes design consultation means for accepting an inquiry including system specifications and retrieving data from the knowledge base section in accordance with the inquiry.

13. An automatic programming system comprising:
   (a) a program constitution trading-off module having (i) first input means for accepting a software specification, (ii) a second input, (iii) a learning section, (iv) means for determining a possible optimum combination of components for a piece of software corresponding to a given software specification, and (v) output means for outputting a possible optimum combination of components;
   (b) a block diagram production module having (i) input means for accepting a possible optimum combination of components from said program constitution trading-off module, (ii) means for producing a block diagram, and (iii) output means for outputting a block diagram;
   (c) a program failure mode and effect analysis module having (i) input means for accepting a block diagram from said block diagram production module, (ii) means for performing failure mode and effect analysis using the block diagram, and (iii) output means for outputting an analysis sheet; and
   (d) a software design reviewing module having (i) input means for accepting an analysis sheet from said program failure mode and effect analysis module, (ii) means for producing design deficiency data, and (iii) output means for outputting said design deficiency data to said second input of said program constitution trading-off means.

14. An automatic programming system according to claim 13, wherein said means for determining a possible optimum combination of components for a piece of software corresponding to a given software specification includes a knowledge base section and an inference section.

* * * * *